United States Patent [19]

Triantafyllou

[11] 4,042,999
[45] Aug. 23, 1977

[54] MINIATURIZED VACUUM CLEANER DEVICE

[76] Inventor: Demetrios Triantafyllou, 585 West End Ave., New York, N.Y. 10024

[21] Appl. No.: 541,763

[22] Filed: Jan. 17, 1975

[51] Int. Cl.² .............................................. A47L 9/02
[52] U.S. Cl. ........................................ 15/422; 15/323; 214/1 BS; 294/64 R
[58] Field of Search ............... 15/397, 422; 214/1 BS, 214/1 BT, 1 BH, 1 BV, 8.5 D; 294/64 R; 269/21; 279/3

[56] References Cited

U.S. PATENT DOCUMENTS

| | | | |
|---|---|---|---|
| 1,755,151 | 4/1930 | Henderson | 15/422 X |
| 2,207,492 | 7/1940 | Spiess | 294/64 R |
| 2,850,279 | 9/1958 | Stoothoff et al. | 294/64 R X |
| 3,207,325 | 9/1965 | Whallon et al. | 214/1 BH |
| 3,330,589 | 7/1967 | Mumma | 294/64 R |
| 3,627,369 | 12/1971 | Nixon | 294/64 R |

Primary Examiner—Christopher K. Moore
Attorney, Agent, or Firm—Charles E. Temko

[57] ABSTRACT

A miniature vacuum cleaner device operated by self-contained dry cells or rechargeable equivalents, and capable of applying light vacuum or pressure through specialized nozzles for such functions as cleaning phonograph records, optical slides, postage stamps and small articles which may be easily disturbed from position upon the occurrence of a substantial draft. The casing element includes means for storing a most commonly used nozzle, and conveniently disassembles for replacement of battery cells and filters. A flexible hose connectable to an exhaust end of the device permits the application of simultaneous pressure and suction to a surface area being cleaned whereby the article bearing the surface does not tend to lift.

1 Claim, 13 Drawing Figures

U.S. Patent    Aug 23, 1977    4,042,999
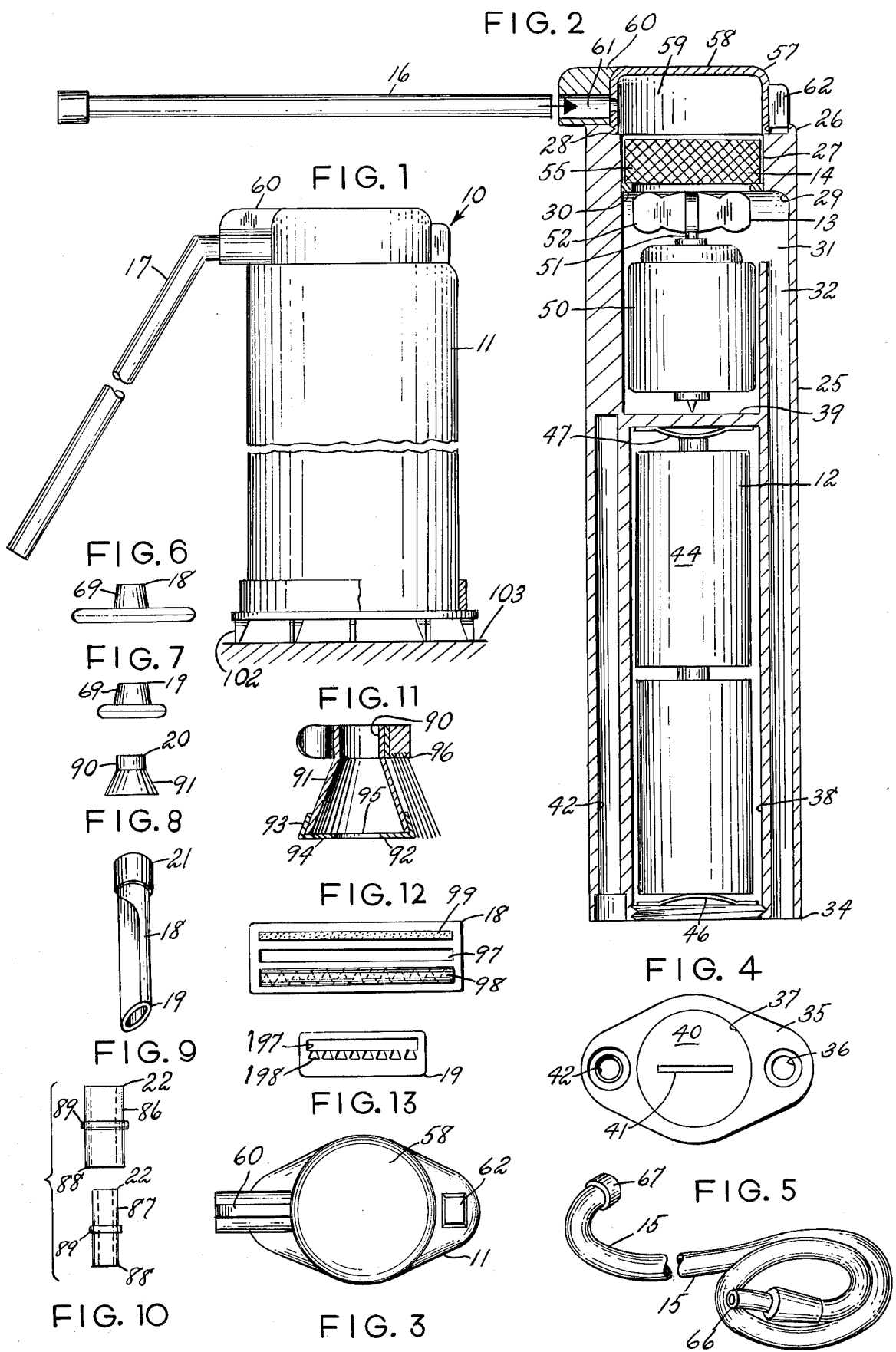

MINIATURIZED VACUUM CLEANER DEVICE

BACKGROUND OF THE INVENTION

Battery powered vacuum cleaning devices are known in the art, and for the most part, they are adapted to perform cleaning functions substantially indentical to those of externally powered devices, usually performing them in less efficient manner. Hand operated air bulbs are also known for the ability to produce gentle currents suitable for dusting of photographic lenses and the like, although their utility is limited by the fact that it is difficult to control the amount of pressure applied, and to sustain the pressure for any substantial period of time. It is also known in the art to produce a gentle vacuum for the purpose of lifting extremely lightweight articles such as gold leaf, whereby the same may be transported from a stack to a situs for installation. Such devices do not afford means for cleaning the surfaces of lightweight articles without disturbing them from their present location.

SUMMARY OF THE INVENTION

Briefly stated, the invention contemplates the provision of a self-contained battery operated vacuum cleaning device in which an impeller applies suction at one end of a casing and pressure at another to create a continuous air current, in which gently moving air is deposited upon the surface to be cleaned, and suction picks up this current together with loosened dust or soil. Because air is being replaced at the same rate it is being removed, the surface being cleaned does not tend to transport itself in a direction toward the source of suction. The device is conveniently disassembled when not in use, and includes means for storing certain of the attachment implements.

BRIEF DESCRIPTION OF THE DRAWING

In the drawing, to which reference will be made in the specification, similar reference characters have been employed to designate corresponding parts throughout the several views.

FIG. 1 is a side elevational view of an embodiment of the invention.

FIG. 2 is a longitudinal sectional view thereof.

FIG. 3 is a top plan view thereof.

FIG. 4 is a bottom plan view thereof.

FIG. 5 is a fragmentary view in perspective of a flexible hose attachment.

FIGS. 6, 7 and 8 are side elevational views of suction nozzle attachments which are selectively interconnectable for use.

FIG. 9 is a perspective view of an elongated nozzle element.

FIG. 10 is an exploded view in perspective of a pair of coupler elements suitable for interconnecting parts of the embodiment.

FIG. 11 is an enlarged longitudinal sectional view of the structure shown in FIG. 8 with an alternative dust brush attachment.

FIG. 12 is a bottom plan view as seen from the lower portion of FIG. 6.

FIG. 13 is a bottom plan view as seen from the lower portion of FIG. 7.

DETAILED DESCRIPTION OF THE DISCLOSED EMBODIMENT

In accordance with the invention, the device, generally indicated by reference character 10, comprises broadly: a casing element 11, a self-contained power supply 12, an air impeller element 13, a filter element 14, flexible hose means 15, rigid straight conduit means 16, angularly disposed conduit means 17, nozzle means 18, 19, 20 and 21; and coupling means 22.

The casing element 11 is preferably formed from synthetic resinous molded parts, and includes an elongated tube 25 having an upper end 26 leading to a longitudinal bore 27 supporting the filter element 14. The bore 27 includes a threaded end 28. A counterbore 29 houses the impeller element 13, and is coaxially disposed with respect to the bore 27. A transversely extending septum 30 forms an exhaust chamber 31 communicating with a longitudinal bore 32 extending to the lower end 34 of the casing element 11.

The lower end 34 is bounded by a flat surface 35 having an opening 36 for the bore 32. A larger threaded opening 37 leads to a bore 38 enclosing the power supply 12, the bore terminating in a septum 39. The opposite end of the bore is closed by a threaded cap 40 having coin slot opening means 41 of well known type. A parallel blind bore 42 selectively stores the conduit means 16 when not in use.

The self-contained power supply 12 may comprise rechargeable cells 44 and 45, or, if desired, conventional dry cells having equivalent voltage. Contact plates 46 and 47 complete circuitry (not shown) leading to the air impeller 13 in well known manner.

The impeller element 13 includes a direct current motor 50, the output shaft 51 of which mounts an impeller 52. The filter element 14 may be formed of fine gauze or highly porous paper forming a filler 54 surrounded by a frame 55 to permit the same to be readily removed for replacement. The filter element 14 is disposed beneath a threaded cap 57 having an upper wall 58 defining a suction chamber 59. Conduit-engaging means 60 includes a bore 61 forming a force fit with any desired suction attachment. A slideably mounted button 62 operates switch means (not shown) in series with the circuitry leading from the power supply to the impeller element.

The flexible hose means 15 may be formed of synthetic resinous tubing 65 provided with an engaged end 66 and a free end 67, the former of which engages the opening 36. By simultaneous use of the means 15 and either the conduit means 16 or the conduit means 17, it is possible to simultaneously subject a small area being cleaned to both pressure and suction to create a controlled air flow whereby small particles of dust may be lifted from the surface without tendency to disturb the surface itself.

The nozzle means 18, 19 and 20 (see FIGS. 6, 7 and 8, respectively) resemble existing parts known in the art on a larger scale, and are suitable for use where suction only is desired. Each includes a conically shaped hollow stud 69 which may be attached to the free end of the means 16 or 17, and a flat sealing member 70 which assists in maintaining an effective vacuum over the area being cleaned. The nozzle means 21 is preferably of rigid construction, and includes a coupling end and an elongated tube 18 forming an end 19 adapted to be inserted into a not readily accessible interstice in an article being cleaned (not shown).

Referring to FIG. 10, the coupling means 22 may be of molded synthetic resinous material having a substantial degree of resilience. The means includes a larger element 86 and a smaller element 87, each including a length of tubing 88 and an annular externally positioned bead 89 making possible the interconnection of any desired nozzle to any desired outlet or conduit, either by the individual use of the larger element 86 or the smaller element 87, or the inserting of the element 87 within the element 86 to make possible the interconnecting of parts of different effective diameter.

Reference is made to FIGS. 8 and 11. Nozzle means 20 includes a tubular coupling member 90 and a flared member 91. Surrounding the latter is a resilient flexible membrane 92 of natural or synthetic rubber-like material, the membrane 92 including a peripheral contractive flange 93 and a planar centrally disposed portion 94. A concentrically disposed opening 95 is disposed in the most flexible part of the membrane, and is adpated to surround a small object so that it may be retrieved from an otherwise inaccessible interstice under suction. A plurality of membranes 92 may be provided, each having an opening of different size to provide for the retrieval of objects of varying corresponding sizes, retrieval being effected by allowing air sucked through the opening to pick up the object which becomes lodged within the opening, to be subsequently manually removed. A removable brush structure 96 resembles that employed for collecting dust from the phonograph records as the same are played, and maybe optionally employed to assist in dislodging objects to be retrieved to a position where they may be engaged by the membrane 92.

FIG. 12 illustrates the lower end of the nozzle means 18, including a centrally disposed vaccum opening 97, a spiral brush member 98 for loosening soil, and an impregnable member 99 holding a lubricant (not shown). This construction is particularly suited for cleaning phonograph records, following which they are coated with an anti-static lubricating material facilitating subsequent playing.

FIG. 13 illustrates the lower end of nozzle means 19, in which the lower surface is provided with an air exhaust 197 which communicates with a plurality of recesses 198 of generally triangular shape, and having sides which converge toward the slot 197. The result of this construction is to cause an increase in the velocity of air being exhausted at the point of communication with the suction slot, making possible the picking up of more difficult or sticky particles from a surface being treated. This nozzle means is suitable for general cleaning not requiring the disposition of a lubricating material following the cleaning operation.

Referring again to FIG. 1 in the drawing, the casing element 11 may be positioned upon a skeletonized stand 102, permitting the device to be moved over a planar surface 103 to be cleaned with substantially uniform suction, which action would not normally be possible as a hand held operation.

It may thus be seen that I have invented novel and highly useful improvements in portable self-contained vacuum cleaning devices, in which means is provided not only for the removal of soil from a surface to be cleaned, but for the performance of a variety of tasks, such as the retrieval of very small lightweight parts which cannot be otherwise engaged from a contaminated surface. Where the surface being cleaned is on an object of very lightweight, provision is made for the removal of soil without otherwise disturbing the surface from the standpoint of location.

I wish it to be understood that I do not consider the invention limited to the precise details of structure shown and set forth in this specification, for obvious modifications will occur to those skilled in the art to which the invention pertains.

I claim:

1. A nozzle for a vacuum cleaning device comprising: a relatively rigid tubular coupling member having a flared free end, a resilient flexible membrane of rubber-like material, said membrane including a peripherally-located contractal flange surrounding said free end, and a centrally disposed portion placed under tension by such engagement, there being a concentrially disposed opening in said last mentioned portion resiliently distortable in the plane of the membrane to conform sufficiently to an engaged object to at least partially seal said opening and maintain a sufficient pressure differential to allow said object to be retrieved; said membrane being removable for purposes of replacement with a similar membrane having a differently sized opening.

* * * * *